United States Patent [19] [11] 3,953,326
Reimann [45] Apr. 27, 1976

[54] OXYGEN AERATION SYSTEM FOR CONTAMINATED LIQUIDS

[76] Inventor: Hans Reimann, Beethovenstrasse 21, 8023 Pullach, Germany

[22] Filed: July 24, 1974

[21] Appl. No.: 491,374

[30] Foreign Application Priority Data
July 26, 1973 Germany............................. 2338000
July 26, 1973 Germany............................. 2337999

[52] U.S. Cl. ................................... 210/7; 210/15; 210/195 S; 210/220
[51] Int. Cl.² .................................................. C02C 1/06
[58] Field of Search ............... 55/52, 68; 210/7, 14, 210/15, 48, 63, 195, 197, 219–221; 261/77

[56] References Cited
UNITED STATES PATENTS

| | | | |
|---|---|---|---|
| 1,937,434 | 11/1933 | Platt........................................ | 210/14 |
| 2,366,945 | 1/1945 | Walker..................................... | 55/52 |
| 2,638,444 | 5/1953 | Kappe...................................... | 210/14 X |
| 3,439,807 | 4/1969 | Danjes..................................... | 210/14 X |
| 3,547,811 | 12/1970 | McWhirter............................... | 210/15 X |
| 3,547,813 | 12/1970 | Robinson et al......................... | 210/15 X |
| 3,617,562 | 11/1971 | Cywin et al.............................. | 210/48 |
| 3,660,277 | 5/1972 | McWhirter et al...................... | 210/7 X |
| 3,794,303 | 2/1974 | Hirshon................................... | 261/77 X |
| 3,840,216 | 10/1974 | Smith et al............................... | 210/14 X |

Primary Examiner—Charles N. Hart
Assistant Examiner—Robert H. Spitzer
Attorney, Agent, or Firm—Millen, Raptes & White

[57] ABSTRACT

In a process for the purification of an organically contaminated liquid in an aeration tank in the presence of activated sludge, wherein a gas having a higher concentration of oxygen than air is introduced into an aeration tank, containing a mixture of liquid and activated sludge said tank having above at least the major part of the liquid, an atmosphere more enriched with oxygen than air, wherein said liquid and activated sludge are passed to a secondary settling tank and wherein a portion of the activated sludge obtained from the secondary settling tank is recycled as return sludge into the aeration tank, the improvement which comprises:
subjecting at least a portion of said mixture or a recycle stream thereof to a stripping step with a gas to strip out $CO_2$ from said liquid and prevent a buildup of $CO_2$ in said aeration which would otherwise lower the efficiency of the purification process.

10 Claims, 7 Drawing Figures

OXYGEN AERATION SYSTEM FOR CONTAMINATED LIQUIDS

BACKGROUND OF THE INVENTION

This invention relates to a process and apparatus for the purification of an organically contaminated liquid in the presence of activated sludge, wherein an oxygen-enriched gas is introduced into the liquid within an aeration tank, and an atmosphere more enriched with oxygen than air is maintained at least above the largest part of the liquid, and wherein a portion of the sludge obtained in a secondary settling tank is recycled as a return sludge into the aeration tank.

Processes for the purification of an organically contaminated liquid (e.g., sewage) are known wherein a gas having a higher concentration of oxygen than air is fed to the liquid in a sealed aeration tank in the presence of activated sludge. A portion of the liquid-sludge mixture produced in the aeration tank is continuously transferred into a secondary settling tank wherein the sludge is separated from the liquid, and at least a portion of the sludge obtained in the secondary settling take is continuously recycled into the aeration tank.

The most serious disadvantage of these conventional methods is that the purification efficiency is not constant per unit time, especially when degrading high concentrations of organic impurities, but rather decreases with time. Within the aeration tank, the liquid phase as well as the gaseous phase, i.e. the atmosphere present in the aeration tank, are constantly enriched with $CO_2$ as a consequence of the biological reactions effecting the purification of the liquid. This is especially the case with high $BOD_5$ concentrations in the liquid since large oxygen consumptions are required resulting in extensive metabolic products, particularly $CO_2$. This $CO_2$ concentration, which is constantly on the increase in the aeration tank and cannot be reduced by the very low inert gas concentrations in the aeration gas, leads to an extremely disadvantageous effect on oxygen utilization and to a constant reduction in the pH value of the liquid-sludge mixture; as a consequence thereof, the purification efficiency is constantly on the decrease.

SUMMARY OF THE INVENTION

An object of this invention, therefore, is to provide a system for the purification of an organically contaminated liquid, the purifying effect of which is chronologically approximately constant, even in case of high $BOD_5$ concentrations of the liquid.

Upon further study of the specification and appended claims, further objects and advantages of this invention will become apparent to those skilled in the art.

These objects are attained by subjecting at least a portion of the mixture of sludge and liquid to recycle fraction thereof to a stripping step to remove $CO_2$ therefrom.

The process of this invention thus provides a simple control of the $CO_2$ concentration in the aeration tank, i.e. that concentration which otherwise prevents a constant rate of purification, by stripping out, by mass transfer with gas, the $CO_2$ obtained in the aeration tank continuously at least from a portion of the matter present or recycle to the aeration tank. This has the result that the pH value of the liquid-sludge mixture in the aeration tank remains constant, and the efficiency of the total oxygen utilization is not adversely affected. Air is preferred for stripping.

The stripping of the liquid can be conducted within or outside of the aeration tank. When stripping within the aeration tank, it is advantageously accomplished by producing a liquid current in the aeration tank and blowing or stirring the air into this current. In the current, the metabolic products, especially $CO_2$, diffuse into the gaseous phase by mass transfer into the air, and flow in admixture with the air, toward the surface of the liquid. At the end of this upwardly directed gaseous flow, the gaseous mixture is withdrawn from the aeration tank, while the liquid current, now extensively freed of metabolic products, is readmixed to the residual mixture in the aeration tank. By this additional cycle provided within the aeration tank, it is possible to maintain the $CO_2$ concentration, in particular, in the aeration tank constantly below a desired maximum value, with the consequence that the pH value of the liquid does not decrease continuously, but rather remains essentially constant, and that the oxygen utilization in the aeration tank is not hindered by excessively high $CO_2$ concentrations.

When conducting the stripping step outside of the aeration tank, a partial stream of the recycle activated sludge and/or liquid-sludge mixture is withdrawn from the aeration tank, stripped in mass transfer with air in a suitable stripping unit, and after being extensively freed of metabolic products, recycled into the aeration tank. The maximum desired steady-state $CO_2$ concentration in the gas phase of the aeration tank depends on several parameters, the most important of which is the alkalinity of the homogenized liquid phase of the aeration tank. We consider the most preferred maximum to be 2 times the alkalinity in (mval/1). In any case the preferred maximum should be not higher than 4 times the alkalinity. Under special circumstances, e.g. a high concentration of Ca-ions, a lower preferred maximum must be considered if e.g. a precipitation of $CaCO_3$ is to be avoided.

The expression "mval/1" is an abbreviation of "milliequivalents per liter" (Patterson, German-English Dictionary for Chemists, 3rd Edition, John Wiley & Sons, Inc., New York, p. 307). Thus, for example, assuming an alkalinity of 10 mvaal/1, the preferred maximum steady state concentration of $CO_2$ in the gas phase is 20% by volume — as demonstrated in Example 1 infra.

The portion of the stream that must be stripped to maintain the desired steady-state $CO_2$ concentration depends on the following parameters that may vary within a broad range, i.e. the quantity of $CO_2$ produced per unit time, the quantities of $CO_2$ lost in the liquid overflow and of the oxygen off-gas per unit time and the efficiency of the stripping device. To one skilled in the art it will be possible to find out the minimum portion in each particular case.

In accordance with a further embodiment of the process, the partial stream of the liquid-sludge mixture withdrawn from the aeration tank for stripping purposes can also be fed, after the stripping step, directly to the secondary settling tank, and in this case the $CO_2$— depleted sludge is recycled into the aeration tank as return sludge. As the partial stream to be stripped, it is possible to use, according to this embodiment, a portion, or also the entire quantity, of the liquid-sludge mixture which in any case is discharged from the aeration tank into the secondary settling tank.

According to a further, particularly advantageous embodiment of the process, the material subjected to the air stripping step is neither a portion of the liquid-sludge mixture present in the aeration tank, nor a portion of this mixture discharged into the secondary settling tank, but rather that portion of the sludge obtained in the secondary settling tank which is recycled as return sludge into the aeration tank. This sludge is a sludge of at least 0.8% solids.

The stripping step proper can be effected by any conventional means, e.g., in a conventional spray tower, especially a trickling type, with artificial or natural air circulation. Moreover, the stripping process can also be conducted in a vessel effective simultaneously as a pump, with the advantage that at least a part of the pumping power for the circulation of the liquid-sludge mixture to be stripped can be provided by the air which is simultaneously required as the stripping gas.

It was found that the stripping gas for driving out the $CO_2$ can also be a gas enriched more strongly in oxygen than air. This results in a higher oxygen concentration in the liquid than corresponds to the saturation relatively to the air. For example, the stripping gas, when enriched with oxygen, can have a concentration of oxygen of about 40 to 90% by volume. Likewise, any other gas for stripping out the $CO_2$ from the liquid can be employed as long as it does not interfere with the purification process.

One apparatus for conducting the process of this invention is characterized by at least one well, open on both ends, which is arranged in the aeration tank, the lower end of this well being immersed in the liquid and the upper end of this well being extended into the proximity of the water level, where it forms a weir for the circulated stream. Spaced away from and surrounding the well, a partition is provided, the lower end of this partition being immersed in the liquid and the upper end of this partition being connected in a gastight manner with the cover of the aeration tank. Interior of the well are provided at least one liquid-conveying means and a gas supply means.

In this apparatus, an upwardly or downwardly directed liquid current is produced within the well by means of the liquid-conveying means; into this current is continuously introduced, by means of the gas feed means, a gas, primarily air, to drive out the metabolic products, especially the $CO_2$, dissolved in the liquid. If the current is oriented upwardly in the well, the liquid passes over a weir into a channel formed by the well and the partition and back into the tank, where it is readmixed to the liquid in the aeration tank. If the flow direction is reversed, the liquid rises in the outer channel, flows over the weir into the well, and returns at the lower well end into the tank. In this case, the flow velocity in the well is selected so that the $CO_2$-enriched air can exit in the upward direction. The partition, which is immersed with its lower end in the liquid and is connected gastight with the cover of the aeration tank with its upper end, separates the atmosphere existing over the largest part of the liquid surface, which is more strongly enriched with oxygen than air, from the surroundings.

The gaseous mixture consisting essentially of air and $CO_2$ obtained during the mass transfer taking place in the well leaves the aeration tank via the open, top end of the well, which is in communication with the surroundings. The position and construction of the well can be adapted to the flow relationships within the aeration tank.

It was found to be advantageous from the viewpoint of fluid dynamics to arrange the well either in the central zone of the tank cross section or directly in the proximity of a sidewall of the tank. A further improvement in the fluid dynamics within the tank and thus in the intermixing of the liquid stream freed of metabolic products with the liquid not partaking in the mass transfer within the well is attained by providing, in the case of a flow which is directed upwardly in the well, that the lower ends of the well and partition are bent outwardly (as seen from the interior of the well). A further improvement comprises an additional, likewise outwardly bent, baffle for the liquid disposed externally of the well, approximately at the level of the lower end of the partition.

Another advantageous apparatus to conduct the process is characterized by at least two wells open on both ends, of which the first is directly adjacent a sidewall of the aeration tank and the second is disposed in the direct proximity of the opposite sidewall, wherein each well is immersed with its lower end in the liquid of the aeration tank and is connected gastight along its upper end with the cover of the aeration tank, and wherein a liquid-conveying means and a gas feed means are provided in the interior of the first well.

BRIEF DESCRIPTION OR DRAWINGS

In each of FIGS. 1 through 7, there are schematically illustrated separate embodiments of preferred apparatus and systems of this invention.

FIG. 1 depicts stripping within the aeration tank.

The embodiment of FIG. 2 differs from that of FIG. 1 by the arrangement of the well.

FIG. 3 employs a surface agitator and horizontal baffle.

DESCRIPTION OF ILLUSTRATED PREFERRED EMBODIMENTS

Figure 1:
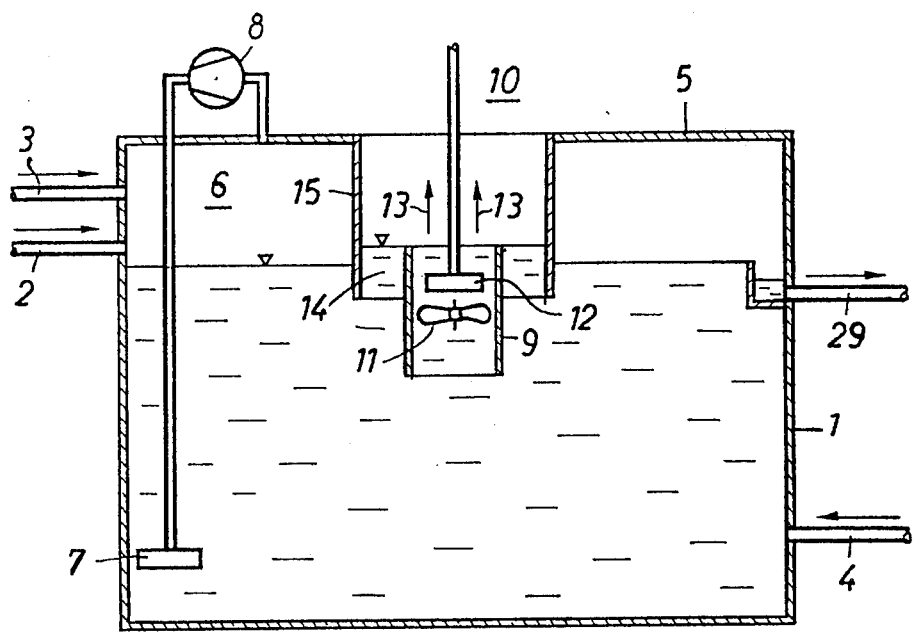

According to FIG. 1, showing one embodiment of the invention, an aeration tank 1 is fed, via conduit 2, with organically contaminated wastewater; via conduit 3, with a gas greatly enriched with oxygen; and, via conduit 4, with activated sludge from a secondary settling tank, not shown herein. Via conduit 29, treated liquid-sludge mixture is discharged from the aeration tank into the secondary settling tank. The aeration tank 1 is provided with a cover 5, separating the atmosphere present in the aeration space 6, enriched with oxygen to a greater extend than air, from the surroundings. Via a gasifying system 7 and the blower 8, oxygen is constantly introduced into the organically contaminated wastewater.

Due to the biological reactions causing the degrading of the organic impurities, metabolic products are continuously produced in the aeration tank, especially $CO_2$, resulting in a disadvantageous drop in the pH of the wastewater-sludge mixture in the aeration tank and in a reduced utilization of the oxygen, and thus in total leading to a reduced purification efficiency of the process.

In order to avoid these disadvantages, a well 9, open on both ends, is provided in the aeration tank 1, the lower end of this well being immersed in the wastewater-sludge mixture and the upper end of this well terminating in the proximity of the water level and being in communication with the surroundings 10. Within the well 9, the cross section of which is circular, for example, a liquid-conveying means 11, e.g. an agitator, and an air supply means 12, e.g. a sparger, are arranged one above the other. While the liquid-conveying means 11 generates within the well 9 an upwardly or downwardly directed liquid current, the air supply means serves to introduce air into this current. During this process, mass transfer takes place in the current so that the metabolic products, especially the $CO_2$, dissolved in the liquid phase at first, diffuses into the gaseous phase. The thus-obtained gaseous mixture, consisting essentially of $CO_2$ and air, leaves the aeration tank 1 in the direction of arrow 13, while the liquid, extensively freed of metabolic products, is discharged either via the annular channel 14 formed, on the one hand, by the well 9 and, on the other hand, by a partition 15, or, using the reverse flow direction, exits via the lower, open end of the well and is then again combined with the liquid-sludge mixture in the aeration tank. The partition 15, immersed with its lower end in the liquid of the aeration tank 1 and connected gastight with its upper end with the cover 5 of the aeration tank, prevents the escape of the oxygen-enriched gas present in space 6 into the surroundings 10. (The term "liquid" means liquid-sludge mixture in the description of FIGS. 1–4.)

Figure 2:
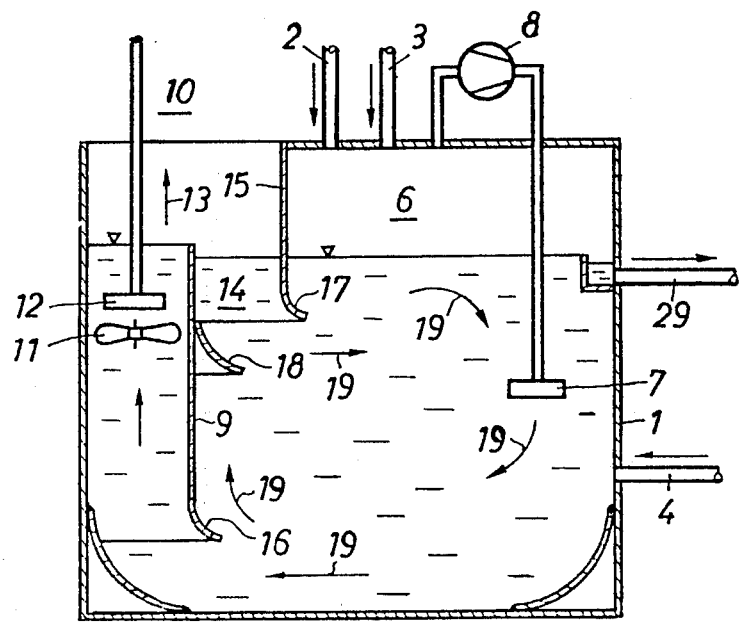

The embodiment of FIG. 2 differs from that of FIG. 1 essentially by the arrangement of the well 9 which, according to FIG. 2 is in the direct proximity of a sidewall of the aeration tank 1, wherein the lower end 16 of the well, as well as the lower end 17 of the partition 15 are, as seen from the interior of the well, bent outwardly in case of the liquid current rising within the well. Moreover, an additional liquid-guiding baffle 18, likewise bent outwardly as seen from the interior of the well, is disposed approximately at the level of the lower end of the partition 15. As shown by the various flow arrows 19, the well arrangement according to FIG. 2 makes possible a more uniform intermixing of the liquid depleted in metabolic products, returning into the tank from the upper end of the well 9 via the annular channel 14, with the liquid in the aeration tank 1.

Figure 3:
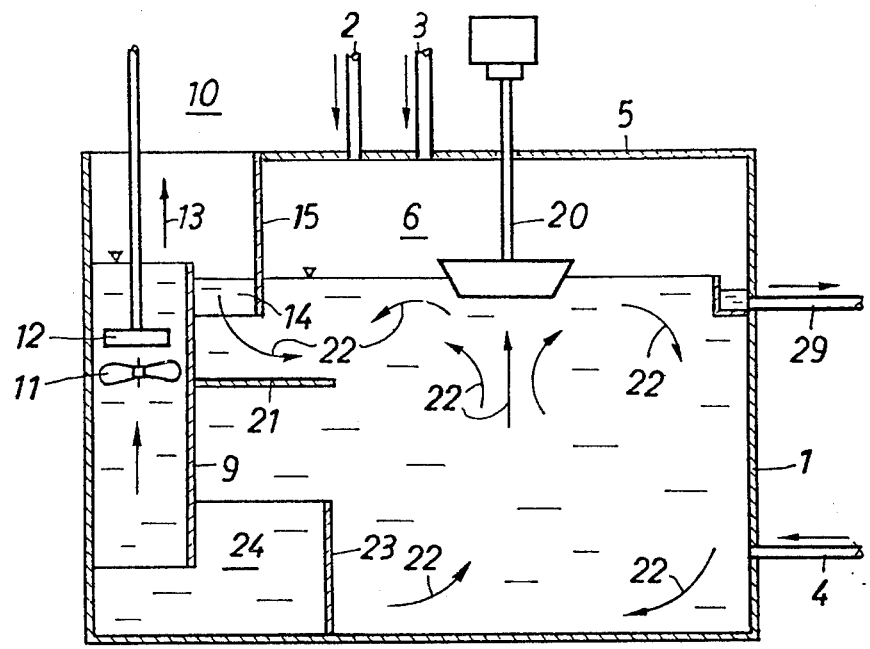

A further embodiment of the invention is shown in FIG. 3, wherein the strongly oxygen-enriched gas introduced into the aeration tank 1 via conduit 3 is incorporated into the liquid, in this arrangement, by means of a surface agitator 20. As contrasted to FIG. 2, the well 9 in this embodiment has a horizontal liquid baffle 21. Furthermore, the aeration tank has a further partition 23, disposed in parallel to the lower end of the well 9, leaving a flow channel 24. The provision of the additional partition 23 prevents the intake of oxygen-containing gas bubbles, present in the bottom zone of the tank 1, through the liquid-conveying means 11 in the well 9. It was found that the plant operates most effeciently if the velocity of the liquid flowing through the channel 24 is maintained to be lower than 15 cm./sec. The flow of the liqiud current in the aeration tank 1 here again is indicated by the arrows 22, showing the flow direction.

Figure 4:
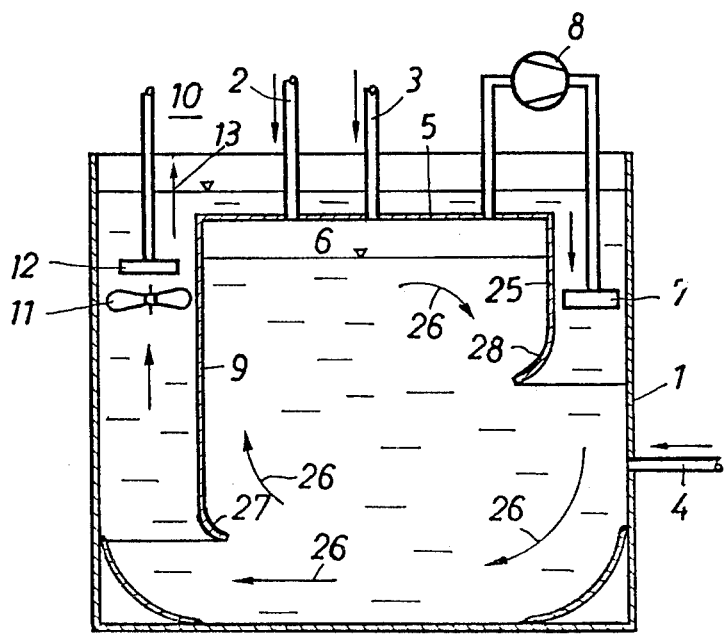
FIG. 4 shows the use of wells.

A particularly advantageous embodiment of the invention is shown in FIG. 4.

According to this embodiment, two wells 9 and 25, open at both ends, are arranged within the aeration tank 1. Along their upper edges, these wells are connected gastight with the cover 5 of the aeration tank, the liquid-conveying means 11 and the air feed means 12 being disposed within the first well 9.

According to this arrangement, a portion of the liquid present in the aeration tank 1 is conveyed through the well 9 from the bottom toward the top; by means of blown-in air, the dissolved metabolic products, especially the $CO_2$, are driven out and withdrawn from the plant in the direction of arrow 13. The liquid, depleted in metabolic products, now flows over the cover 5 and is recycled into the interior of the aeration tank 1 by way of the second well 25. During its flow through the well 25, the liquid is combined, by way of the gas feeding system 7, with treatment gas strongly enriched in oxygen, from the closed-off space 6. The flow velocity in the well 25 is chosen to be so high that the gas bubbles do not escape in the upward direction.

In order to improve the flow relationships of the liquid in the aeration tank, here indicated by arrows 26, it is also possible in this embodiment to bend the lower ends 27 and 28 outwardly of the two wells 9 and 25, respectively, seen from the interior of the wells.

Figure 5:
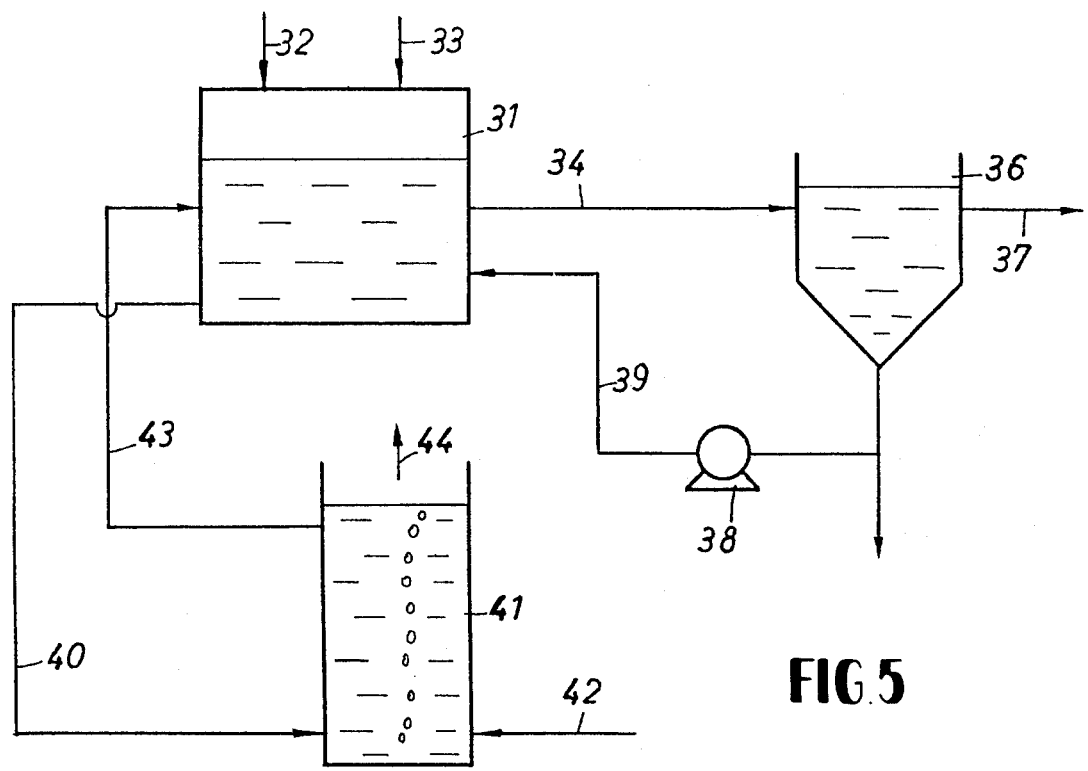
FIG. 5 shows stripping outside the aeration tank by means of a compressed air.

According to the arrangement of FIG. 5, which is an example of a stripping step conducted outside of the aeration tank, an aeration tank 31 is fed, via conduit 32, with the organically contaminated liquid-to-be-purified, i.e. liquid-containing biologically oxidizable components, and via conduit 33, with almost pure oxygen, wherein, for the sake of simplicity, special devices for the introduction of the oxygen into the aeration tank and for the mixing of the liquid-sludge mixture obtained within the aeration tank due to biological reactions, are not illustrated. A portion of the liquid-sludge mixture continuously obtained in the aeration tank 31 is conveyed via conduit 34 continuously into a secondary settling tank 36, where the sludge is separated from the liquid. Whereas the purified liquid is withdrawn from the secondary settling tank 36 via conduit 37, at least a portion of the sludge settled in the bottom zone of the secondary settling tank is recycled, by means of the pump 38, as return sludge into the aeration tank 31 via conduit 39. The quantity per unit time of the sludge to be recycled into the aeration tank depends on the desired sludge concentration in the aeration tank.

During the biological reations taking place in the aeration tank, which effect the degrading of the organic impurities, metabolic products are continuously produced, especially $CO_2$, which have an inhibitory effect on the desired course of the biological reaction, when enriched too strongly in the liquid phase and/or in the gaseous phase above the liquid. In order to avoid these disadvantages, the invention provides that a portion of the liquid-sludge mixture is continuously withdrawn in a separate cycle from the aeration tank 31 via conduit 40 and is subjected to a stripping step in a stripping tower 41 by means of air fed to the stripping tower via conduit 42. The stripped liquid-sludge mixture is recycled into the aeration tank 31 via conduit 43, while the gaseous mixture obtained during the stripping step and consisting essentially of air and $CO_2$ is withdrawn from the stripping tower 41 — as schematically indicated by the arrow 44. The stripping tower 41 in this example is a vessel operated in the manner of a large pump, i.e., the liquid present in the vessel is combined, via conduit 42, with compressed air, leading to a reduction in the specific gravity of the liquid and thus to a convection effect. At the same time, this compressed air serves as the stripping gas to drive off $CO_2$.

Figure 6:
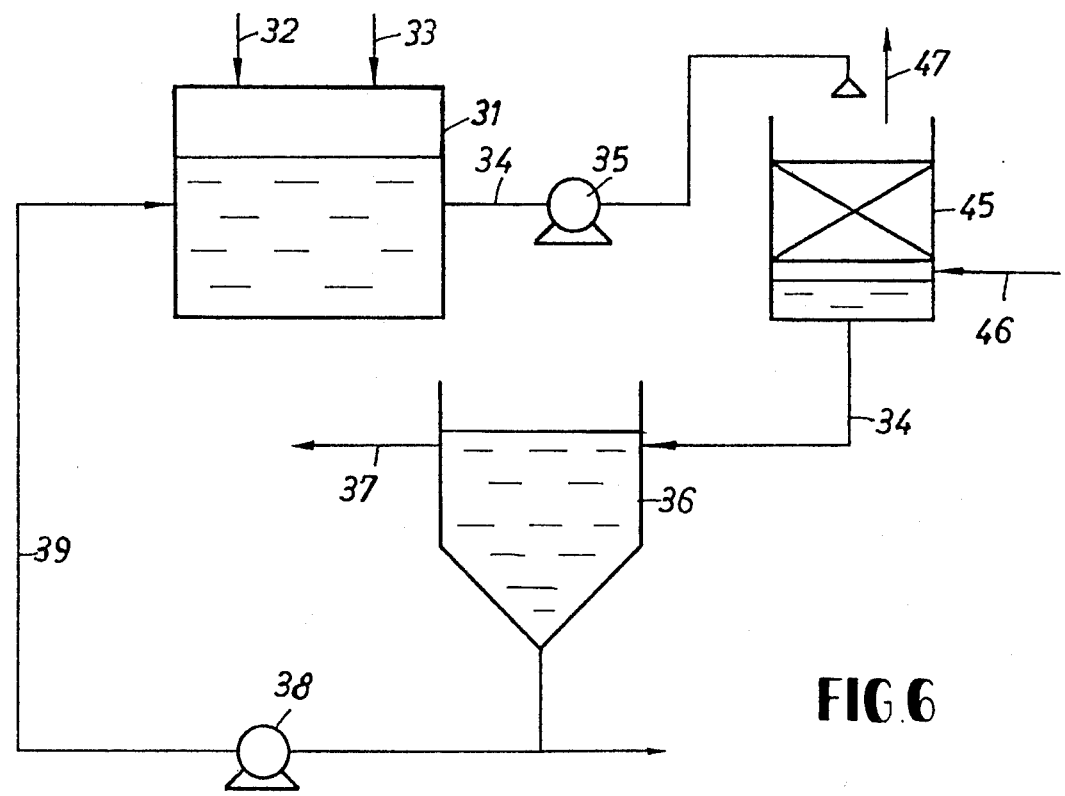
FIG. 6 shows the stripping process conducted in a spray tower.

The embodiment of FIG. 6 differs from that of FIG. 5 essentially in that no separate cycle is provided to strip out gaseous metabolic products, and in that the stripping process is carried out in a spray tower.

According to FIG. 6, the entire liquid-sludge mixture which is to be conveyed from the aeration tank 31 via the pump 35 to the secondary settling tank 36, is first fed to a spray tower 45 wherein the gaseous metabolic products, especially the $CO_2$, are stripped out countercurrently to air introduced via conduit 46. The gaseous mixture obtained during the stripping step, consisting essentially of air and $CO_2$, leaves the spray tower 45 in the direction of arrow 47, while the liquid-sludge mixture, extensively freed of $CO_2$ flows to the secondary settling tank 36. Although it proved to be advantageous to subject the entire amount of the liquid-sludge mixture flowing from the aeration tank 31 into the secondary settling tank 36 to a stripping procedure, it can also be advantageous for some purposes of application to strip only a partial quantity of the liquid-sludge mixture withdrawn from the aeration tank via conduit 34.

Figure 7:
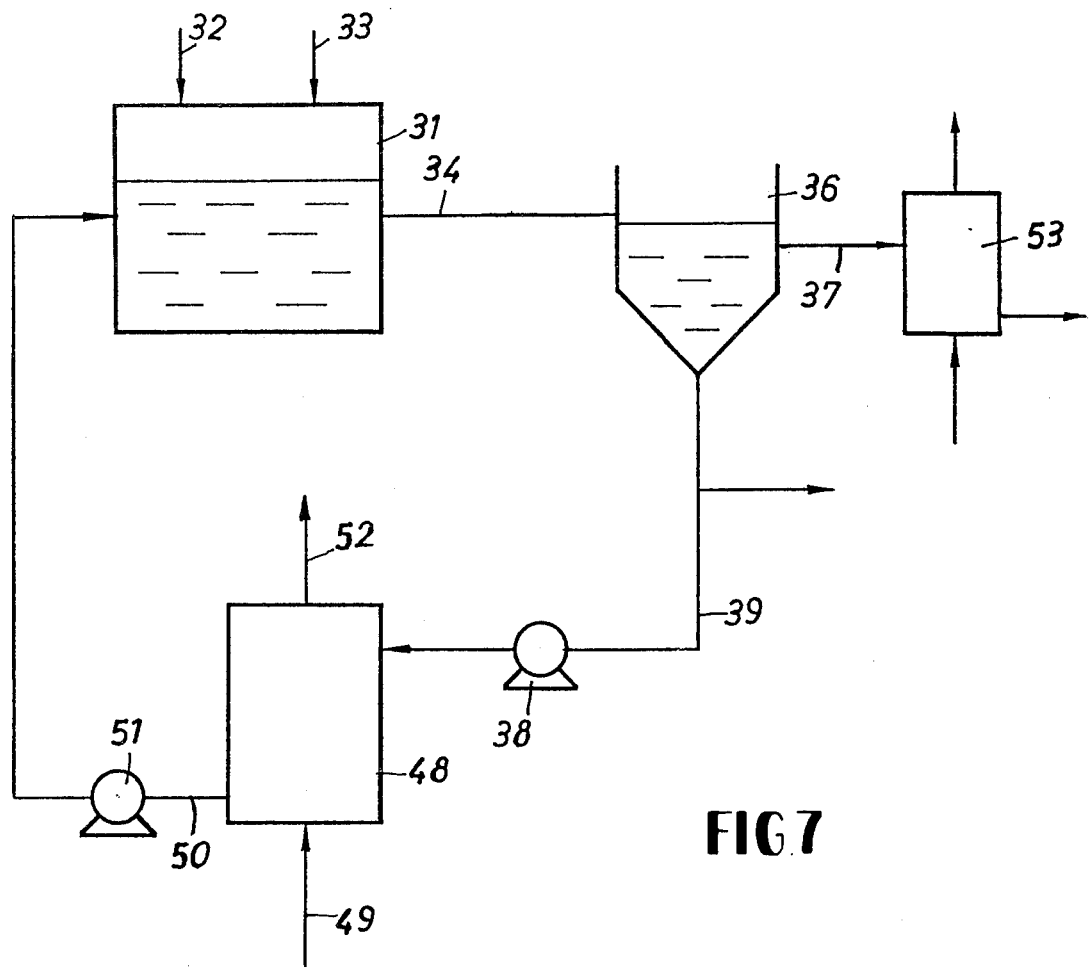
FIG. 7 shows the stripping conducted on the recycle sludge only.

A further exemplary embodiment of the process of this invention is illustrated schematically in FIG. 7. According to this arrangement, the metabolic products, especially to $CO_2$, are stripped out of the portion of the sludge obtained in the secondary settling tank 36 which, as return sludge, is recycled into the aeration tank 31, rather than being stripped out of a liquid-sludge mixture discharged from the aeration tank 31. The stripping step is accomplished in a stripping unit 48, fed via conduit 49 with the required stripping gas, which also in this embodiment is air. The $CO_2$-depleted sludge flows by way of conduit 50 and pump 51 into the aeration tank 31, while the gaseous mixture obtained during the stripping step and consisting essentially of $CO_2$ and air is withdrawn from the stripping unit 48 in the direction of arrow 52.

If desired, the liquid discharged from the secondary settling tank 36 via conduit 37, extensively freed of organic impurities, can likewise be subjected to a stripping step in the stripping unit 53, to drive out the metabolic products, especially the $CO_2$.

The best mode of operation according to this invention depends upon the special conditions of a sewage treating system.

In Example 1 for a sewage flow of 100 m³/h a new oxygen activated sludge system has to be constructed. From a pilot study the following parameters are known: BOD 2000 mg/1, BOD reduction 98 %, BOD load 4.8 kg/m³d, volume of aeration basin 1000 m³, alkalinity of the homogenized liquid 10 mval/1, respiration quotient 0.75 mol $CO_2$/mol $O_2$, desired steady-state concentration of $CO_2$ about 20 Vol-% in the gas corresponding to about 320 mg/1 in the liquid. It was decided to use surface aerators in a closed tank. In this case the best mode of operation should be that according to FIG. 3. The blowers 12 have air flow of about 1300 m³/h in a depth of 0.3m. About 160 kg/h of the 200 kg/h $CO_2$ produced are stripped out, the leaving air having a $CO_2$-content of about 6 Vol-%. About 30 kg/h $CO_2$ are leaving the basin with the effluent and the rest of about 12 kg/h together with the oxygen off-gas. The liquid flow across the well 9 amounts to about 3000 m³/h. Therefore, the channel 24 should have a minimum cross section of about 6 m².

In Example 2 for an existing oxygen activated sludge system a device according to FIG. 5 is selected for upgrading the efficiency of the system. In this case a stripping tower 41 and connecting pipes 40 and 43 are built in without serious interruption of the operation of sewage treatment. These examples give indications of the selection of the best mode of operation according to this invention.

From the foregoing description, one skilled in the art can easily ascertain the essential characteristics of this invention, and without departing from the spirit and scope thereof, can make various changes and modifications of the invention to adapt to various usages and conditions.

What is claimed is:

1. In a process for the purification of an organically contaminated liquid in an aeration tank in the presence of activated sludge, wherein a gas having a higher concentration of oxygen than air is introduced into an aeration tank containing a mixture of liquid and activated sludge, said tank having a zone containing at least the major part of the liquid, said zone further including above said liquid an atmosphere more enriched with oxygen than air, said atmosphere being substantially enclosed from the surroundings wherein said mixture of liquid and activated sludge are passed to a secondary settling tank to form a clarified liquid and an activated sludge fraction and wherein at least a portion of said fraction of activated sludge obtained from the secondary settling tank is recycled as return sludge into the aeration tank, the improvement which comprises:

subjecting at least a portion of at least one stream to a stripping step with air to strip out $CO_2$ from said stream to prevent a buildup of $CO_2$ generated in said aeration tank to over a desired maximum which would otherwise lower the efficiency of the purification process, and to maintain an essentially constant pH, said stream being at least one of: (a) the mixture of liquid and activated sludge before said mixture is settled into said clarified liquid and said activated sludge fraction and (b) said activated sludge fraction, said stripping step being conducted in a second zone separate from said zone including said at least the major part of the liquid and the substantially enclosed atmosphere more enriched with oxygen than air.

2. A process according to claim 1, wherein the stripping step of said mixture is conducted within a liquid current produced in the aeration tank, wherein the gaseous mixture obtained during the stripping process is withdrawn directly from the aeration tank, and the stripped mixture is readmixed to the mixture in the aeration tank.

3. A process according to claim 1, wherein at least a portion of the mixture present in the aeration tank is withdrawn therefrom, is subjected to a stripping step with air, and is thereupon recycled into the aeration tank.

4. A process according to claim 1, wherein at least a portion of the mixture present in the aeration tank is withdrawn, subjected to a stripping step with air, and fed to the secondary settling tank.

5. A process according to claim 1, wherein at least a portion of the sludge obtained in the secondary settling tank is withdrawn, subjected to a stripping step with air, and fed to the aeration tank.

6. A process according to claim 5, wherein the sludge to be stripped with air is at least a portion of the return sludge returned from the secondary settling tank into the aeration tank.

7. A process according to claim 1 wherein the stripping step is conducted in a spray tower.

8. A process according to claim 1, wherein the stripping step is conducted in a vessel wherein the liquid is aerated to such an extent that it has a lower density and is recirculated to the aeration vessel by convection.

9. A process according to claim 1, wherein the maximum steady state percent by volume concentration of $CO_2$ in the gas phase of the aeration tank is not more than 4 times the alkalinity expressed in mill equivalents per liter.

10. A process according to claim 9, wherein said maximum is not more than 2 times.

* * * * *